July 17, 1962 M. E. BROWN 3,044,384
AUTOMATIC EXPOSURE CONTROLS FOR PHOTOGRAPHIC CAMERAS
Filed Jan. 7, 1959 3 Sheets-Sheet 1

MORRIS E. BROWN,
INVENTOR.

BY R. Frank Smith
Robert W. Hampton
ATTORNEYS

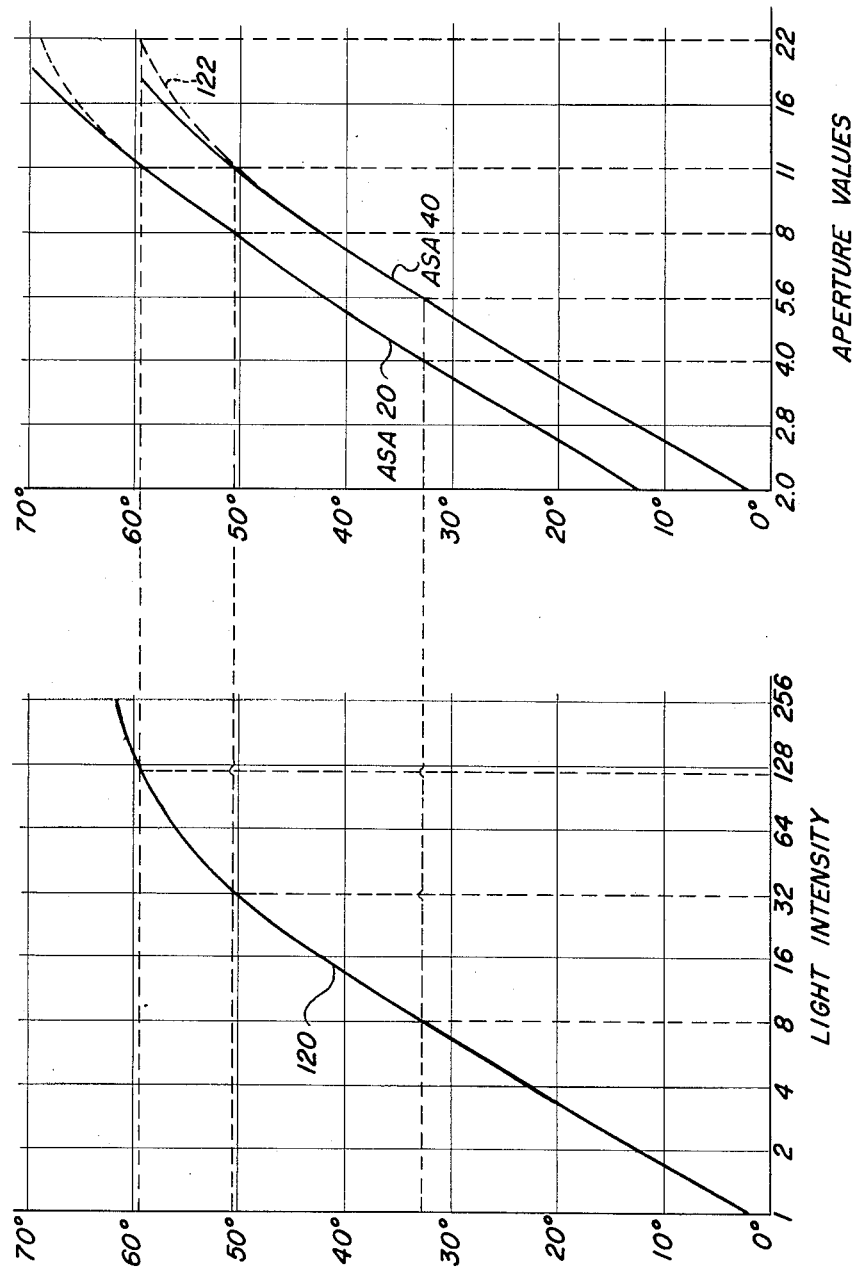

United States Patent Office 3,044,384
Patented July 17, 1962

3,044,384
AUTOMATIC EXPOSURE CONTROLS FOR
PHOTOGRAPHIC CAMERAS
Morris E. Brown, Rochester, N.Y., assignor to Eastman Kodak Company, Rochester, N.Y., a corporation of New Jersey
Filed Jan. 7, 1959, Ser. No. 785,353
14 Claims. (Cl. 95—64)

The present invention concerns photographic cameras and more particularly concerns automatic exposure control system for such cameras.

In cameras having automatic exposure control systems an exposure factor such as the diaphragm opening or the shutter speed is varied as a function of the intensity of light from the viewed scene, or "scene brightness." In motion picture cameras of this type it is especially important that the automatically varied exposure factor be continuously variable to compensate for changes in light intensity that occur during camera operation, particularly when the camera is "panned," i.e., the viewing azimuth is changed. Therefore, in most automatic exposure control systems employed in motion picture cameras a photoelectric-to-mechanical transducer, such as a photocell in combination with a galvanometer energized thereby, is in constant driving relation to a member that sets the exposure factor.

Where the transducer includes a galvanometer that constantly drives a member for setting shutter speed or diaphragm opening the latter member should have a very low mass and should be supported on delicate bearings in order not to impose an impractical load on the galvanometer. It has been found, however, that by employing the transducer merely as an element to be sensed periodically for setting the automatic exposure factor, the exposure setting mechanism may be driven by the camera motor and may therefore be considerably more massive and rugged.

It is therefore a primary object of the present invention to periodically sense the mechanical output of a photoelectric-to-mechanical transducer for setting an exposure factor of a camera as a function of the intensity of light viewed by the transducer. More specifically, it is an object of the invention to set the diaphragm opening of a motion picture camera in the foregoing manner. These objects are achieved by employing the transducer to position a cam and by periodically sensing the cam to establish the appropriate position of one or more diaphragm vanes.

A further object of the invention is to position a cam by means of a photoelectric-to-mechanical transducer, to position a first diaphragm vane by periodic sensing of the cam and to position a second diaphragm vane in accordance with the position of the first vane.

Another object is to position a first diaphragm vane by means of a photoelectric-to-mechanical transducer, then to position a second diaphragm vane by periodically sensing a cam surface on the first vane.

Where an exposure factor is set by sensing a cam that is moved by a photoelectric-to-mechanical transducer, it becomes convenient to compensate for changes in emulsion sensitivity or film speed by rotating the entire mechanical output element of the transducer and thereby changing the entire range of operation of the exposure control system.

It is therefore a further object of the invention to compensate for film speed by physically moving the mechanical output element of a photoelectric-to-mechanical transducer relative to a member that senses the transducer for setting an exposure factor.

Another object is to override the automatic exposure control system of a cam by a manual control that is common to the film speed adjustment.

Other objects of the invention will appear from the following description, reference being made to the accompanying drawings, wherein:

FIG. 4 is a graph showing the relation of instrument coil deflection and vane deflection at two settings of film speed.

Exposure System

Figure 1:
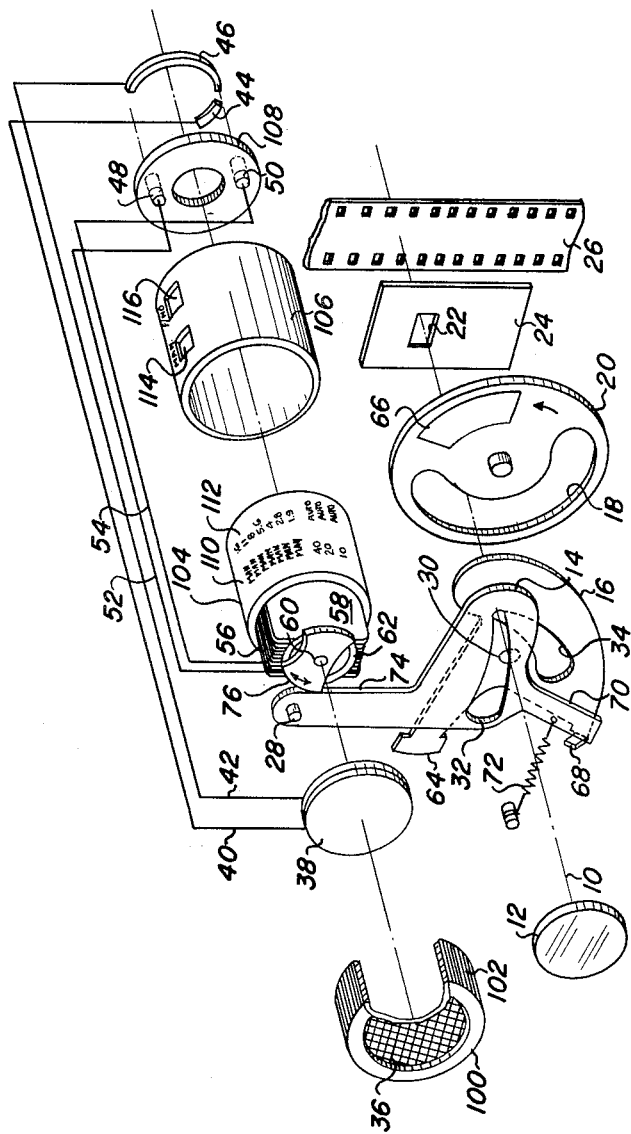
FIG. 1 is an exploded isometric view of one embodiment of the automatic exposure control system constructed in accordance with the invention and shows the film speed setting and manual override mechanisms.

Referring to FIG. 1 the lens axis of a motion picture camera is indicated at 10. Aligned with the axis is a lens system, shown generally at 12, a pair of diaphragm vanes 14 and 16, the aperture 18 of a rotatable shutter 20, a fixed aperture 22 in a plate 24 and a photosensitive surface illustrated as a strip of motion picture film 26. Vanes 14 and 16 are mounted on respective pivots 28 and 30 for angular motion about such pivots and have respective elongated, tapered apertures 32 and 34, which overlap on the lens axis 10. In accordance with the present invention vanes 14 and 16 are rocked about their pivots to various angular positions for bringing such portions of their apertures into overlapping relation that the area of the composite aperture so formed in alignment with the lens axis is a function of the brightness of the viewed scene. The composite aperture formed by the diaphragm vanes, being in alignment with the shutter aperture 18 and the fixed aperture 22 on the lens axis, thereby controls the amount of light reaching film 26 as a function of scene brightness.

Shutter 20 is rotated during an exposure and its aperture 18 therefore periodically exposes the film, as limited by the composite diaphragm aperture, in synchronism with longitudinal movement of the film. Rotation of the shutter and advance of the film may be accomplished in any manner well known in the art; mechanism for performing such functions forms no part of the present invention and is not specifically disclosed herewith.

Light from the viewed scene is received by a lens block 36 and is transmitted thereby to a photocell 38 for energizing the photocell as a function of the scene brightness. The photocell is connected by a pair of leads 40 and 42 through respective switch segments 44 and 46, contacts 48 and 50 and leads 52 and 54 to a coil 56 of a galvanometer-type electrical measuring instrument 58. The switch comprising segments 44 and 46 and contacts 48 and 50 is normally closed to connect photocell 38 to coil 56; its further function will be described hereinafter.

Coil 56 is energized by the photocell and is thereby rocked about a pivot 60 against the tension of a spring 62. The angular displacement of the coil is a function of scene brightness. The photocell 38 and instrument 58 are well known in the art and are merely illustrative of a class of devices definable as photoelectric-to-mechanical transducers. Any device of this class may be employed in the present invention and may comprise, for example, a hot-wire actuator or a solenoid instead of a galvanometer-type instrument. The galvanometer or other mechanical output member of the transducer cooperates with diaphragm vanes 14 and 16 in the following manner.

Vane 16 carries a first tendency-drive member 64, such as a magnet or a frictional surface. A second tendency drive member 66 is carried by shutter 20 and rotates counterclockwise into cooperative relation with member 64 during each rotation of the shutter. The two tendency drive members 64 and 66 thus cooperate to urge vane 16 counterclockwise during each shutter rotation. An ear 68 on vane 16 engages an arm 70 on vane 14 to drive the latter vane counterclockwise with the former. A spring 72 urges vane 14 and therefore vane 16 clockwise and limits the duration of the intermittent counterclockwise movement of the two vanes caused by the tendency drive. Each time member 66 on the shutter is in cooperative relation with member 64 on vane 16, both vanes are urged counterclockwise until a surface 74 on vane 14 engages a cam 76, which is integral with the instrument coil 56. Each time member 66 has passed out of cooperative relation with member 64 spring 72 rocks both vanes clockwise relieving the pressure of surface 74 on cam 76 and thereby allowing the galvanometer to reposition the cam 76 to match any changes in scene brightness that may have occurred between exposures. Therefore, the changing angular position of cam 76 intermittently determines the angular positions of the two vanes. Obviously, the amount of cyclic clockwise movement of vanes 14 and 16 need not be large in order to free cam 76 for movement, and the clockwise movement of the vanes may, for example, be selected by choosing the strength of spring 72. The shape of cam 76 and the position of pivot 28 for vane 14 are chosen such that the line of force between vane 14 and the cam passes substantially through the instrument pivot 60. If there is any tendency for surface 74 of vane 14 to slip on the cam surface, one or both surfaces may be roughened or serrated.

Since vanes 14 and 16 are pivoted on different axes, any angular motion imparted to either vane causes a relative angular motion between the two vanes. Consequently, apertures 32 and 34 overlap on the lens axis in a unique relation for each position of cam 76. The shapes of the apertures and of cam 76, as well as the positions of pivots 28 and 30, may be chosen to produce any of an infinite variety of relationships between the area of the composite aperture and the degree of energization of the instrument. In accordance with the usual practice, the area of the composite aperture is chosen to be inversely related to the energization of the instrument, i.e., inversely related to the scene brightness or light intensity, and provides substantially constant illuminantion of the film 26 throughout the exposure range. A desirable modification of this relationship will be described hereinafter.

In summary of the invention as it is embodied in the structure shown in FIG. 1, cam 76 is angularly positioned as a function of scene brightness and the angular positions of vanes 14 and 16 are intermittently adjusted by sensing the cam. In this manner the overlapping relation of apertures 32 and 34 on the lens axis is intermittently adjusted as a function of scene brightness.

The above construction of the automatic exposure control system is seen to have several advantages. Since the diaphragm vanes are not driven by the instrument, they may be substantial in construction and may be mounted on rugged bearings without imposing any undue load on the instrument. Also, the instrument load comprises a small cam rather than the usual one or more vanes and is thereby minimized to provide easier damping and greater sensitivity than prior art systems.

It will be understood that a great many modifications may be made in the structure shown in FIG. 1 within the scope of the invention. For example, tendency drive member 66 may be mounted on any camera element that rotates or even reciprocates during exposure. If a reciprocating motion is used, spring 72 can be replaced by a second ear mounted on vane 16 on the side of arm 70 opposite ear 68. In this case, the two ears bracket arm 70; therefore, vane 16, which is yieldably driven in both directions, drives vane 14 with it in both directions.

With a rotary tendency drive as shown, spring 72 may be used to urge vane 16, rather than vane 14, clockwise, in which case the second, bracketing ear on vane 16 would again be necessary in order to urge the entire assembly of two vanes clockwise. Also, of course, vane 16 may be dispensed with entirely in which case aperture 32 of vane 14 merely cooperates with the fixed aperture 22 in plate 24 to form the composite exposure aperture. In this latter instance the second tendency drive member 64 would be located directly on vane 14.

Figure 3:
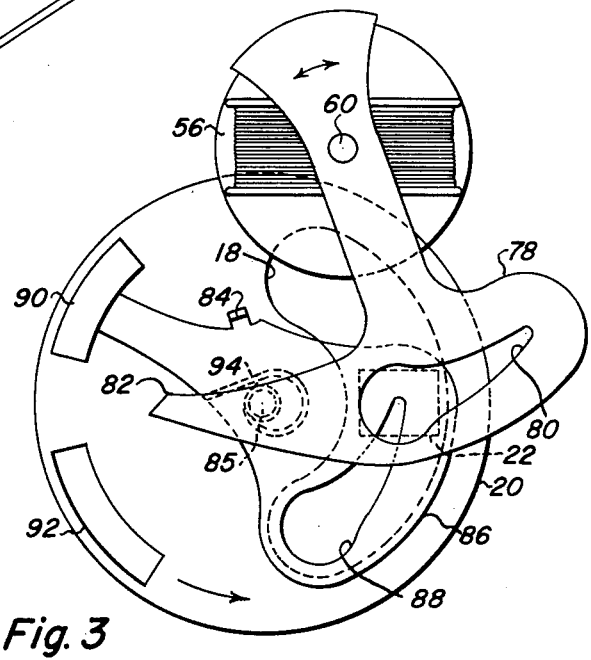
FIG. 3 is a front view of an alternate embodiment of the automatic exposure control system.

A second embodiment of the control system is shown in FIG. 3 wherein a first vane 78 having an aperture 80 is integral with the instrument coil 56 and is continuously positioned thereby about the instrument pivot 60 as a function of scene brightness. A cam surface 82 on vane 78 is adapted to be engaged by an ear 84 on a second vane 86 having an aperture 88. Vane 86 is intermittently urged counterclockwise about a pivot 85 for moving ear 84 into engagement with cam surface 82, by the cooperation of a first tendency drive member 90 on vane 86 and a second tendency drive member 92 on the shutter 20 or other cyclically moving part. During the part of each cycle when the tendency drive members 90 and 92 are not in cooperative relation, a spring 94 urges vane 86 clockwise about pivot 85, thereby moving ear 84 out of engagement with cam surface 82 (as shown in FIG. 3) and permitting vane 78 to be positioned freely by the instrument to account for any change in scene brightness. Apertures 80 and 88 overlap on the lens axis in alignment with the shutter aperture 18 and with fixed aperture 22 as described in connection with FIG. 1. The shape of the cam surface 82 on vane 78, the location of ear 84 on vane 86 and the relative locations of the two vane pivots 60 and 85 are chosen such that the line of force between ear 84 and cam surface 82 passes substantially through the instrument pivot 60.

FIGS. 1 and 3 illustrate automatic exposure control systems wherein two diaphragm vanes are positioned in response to intermittent sensing of a cam that is moved by the instrument, or wherein one vane is positioned by the instrument and the other is positioned by intermittent sensing of a cam surface on the first vane. It will be understood, however, that the invention is not limited to 2-vane diaphragm systems, but also contemplates the positioning of a single diaphragm vane by intermittent sensing of an instrument cam, as well as a system wherein more than two such vanes are so positioned. In the case of a single vane, its aperture may cooperate with the fixed aperture to form an effective, composite exposure aperture and in the case of three or more vanes, their composite aperture may be in the form of an iris or otherwise.

It also is obvious that the invention may be useful in still cameras as well as in motion picture cameras, provided some member moves cyclically to constitute the tendency drive device illustrated as a shutter in FIGS. 1 and 3. In the case of still cameras, especially, the invention obviously is not limited to the intermittent adjustment of diaphragm aperture but also contemplates such adjustment of shutter speed. This may be accomplished, for example, by intermittently positioning the usual shutter speed ring as a function of scene brightness, by means of the adjustment mechanism hereinbefore disclosed.

*Manual Override and Film-Speed Adjustments*

The present automatic exposure control system is adapted for an overriding manual adjustment to account for situations of unusual back lighting, flash operation of a still camera, or the like. This system also is adapted for manual adjustment to compensate for different emulsion sensitivities or film speeds to account for the various types of films that may be used in the camera.

Figure 2:
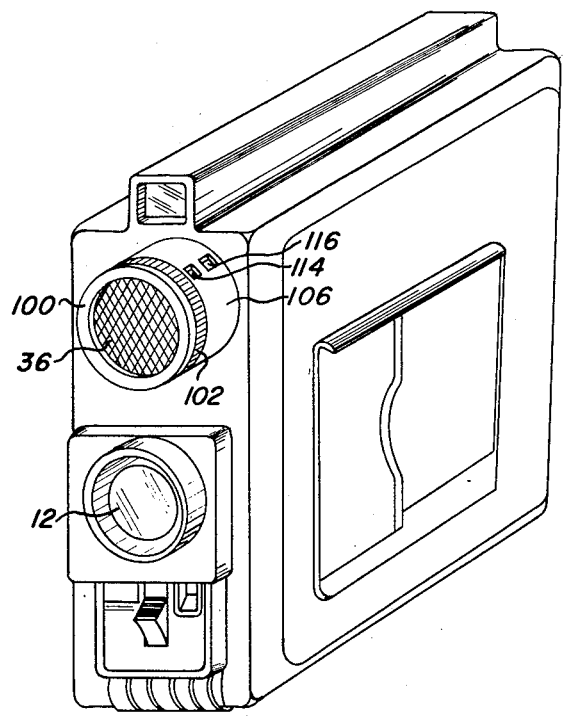
FIG. 2 is an isometric view of a camera incorporating the mechanism shown in FIG. 1.

Referring back to FIG. 2, the previously described lens block 36 is enclosed in the face of a hollow cylindrical adjustment casing 100 having a knurled periphery 102, which permits manual turning of the casing. When the camera is assembled, as shown in FIG. 2, the photocell 38 (FIG. 1) is supported inside the adjustment casing 100 just behind the lens block 36. The instrument 56 is enclosed in a hollow cylindrical scale shell 104, the front of which fits tightly inside of the adjustment casing 100 for manual turning of both the instrument and scale shell with casing 100. The remainder of the scale shell is rotatably supported inside a fixed casing 106, which is mounted on the front of the camera. The previously described switch contacts 48 and 50 are mounted on a ring 108, which is formed of insulating material and is secured to the rear surface of the scale shell 104 for rocking movement therewith inside the fixed casing 106 and relative to the fixed switch segments 44 and 46.

First and second scales 110 and 112 have respective lines of indicia spaced in parallel arcs on the outer surface of the scale shell 104 and cooperate with respective windows 114 and 116 in the fixed casing 106. Each of the two scales is divided into two groups, or ranges, of indicia and the corresponding ranges of the two scales are simultaneously in registry with windows 114 and 116. Scale 110, in its first range, displays the symbol "MAN" or its equivalent to indicate that the diaphragm aperture is set manually rather than in response to the energization of the instrument. The corresponding range of scale 112 consists of successive aperture values, which may be in any convenient form. The aperture values are displayed in window 116 while the symbol "MAN" is displayed in window 114 and indicate the manually set aperture value. The respective second ranges of scale 110 and 112 consist of successive film speed values and the symbol "AUTO" or its equivalent, indicating that the exposure control system operates automatically throughout the second range, but may be adjusted for various film speeds.

Scale shell 104 is shown in FIG. 1 in its "manual" position, wherein the insulating disk 108, which moves with the scale shell, holds contact 48 away from segment 44 and holds contact 50 against segment 46. In this condition the switch comprising the contacts and segments is open and photocell 38 is disconnected from the galvanometer 58 to disable the automatic exposure control system. Spring 62 on the galvanometer maintains cam 76 in its restored position, i.e., its extreme counterclockwise position relative to the galvanometer. The diaphragm is set manually by angular adjustment of casing 102 within the limits of the first scale range. Casing 102 is turned manually to adjust scale shell 104, instrument 58 and cam 76 relative to the fixed casing 106 and diaphragm vane 14. The diaphragm vanes are positioned as previously described when the angular position of cam 76 is manually changed in this manner. The positions of the indicia in the first range of scale 112 are arranged to display in window 116 a value corresponding to the manually set diaphragm aperture.

When casing 102 is manually turned counterclockwise far enough to bring the second ranges of scales 110 and 112 into registry with their respective windows 114 and 116, disk 108 is rocked far enough counterclockwise to engage contact 48 with segment 44. (Contact 50 remains in engagement with segment 46 throughout both of the scale ranges.) This closes the circuit from the photocell to the instrument, thereby energizing the latter as a function of scene brightness and permitting the diaphragm aperture to be set automatically in the manner previously described.

In the second scale range, wherein the symbol "AUTO" appears in window 116, film speed numbers appear in window 114 as previously mentioned. The slowest film speed corresponds to the maximum counterclockwise adjustment of scale shell 104 (and the instrument) and thereby provides larger diaphragm apertures for slower films at a particular scene brightness.

*Compensation for Backlighting*

It has been found statistically that the greatest number of exposures made with high scene brightness are in situations where the selected subject is framed by bright backlighting, usually sky light. In such situations, if an automatic exposure control system were to be calibrated for proper exposure of the bright background, the subject would be underexposed. Therefore it is customary to provide some form of compensation in the exposure control system whereby the statistically average subject is properly exposed under these circumstances.

The usual manner of compensating the background lighting at high scene brightness is to flare the narrow end of each diaphragm aperture to a greater width than it would have for the theoretically ideal exposure if all of the light came from the subject. This system of compensation is fully practical only if each longitudinal section of a diaphragm aperture always corresponds to the same scene brightness, which generally is the case only if all other exposure factors, such as shutter speed and film speed, remain constant. If, however, as is frequently the case, one or more exposure factors other than the diaphragm aperture are varied in the use of a camera, then the compensation that is built into the diaphragm aperture is by itself correct for only those combinations of exposure-factor values that produce the same diaphragm opening for a given scene brightness.

In the case of motion picture cameras and many still cameras, it is the general practice to maintain shutter speed constant and to adapt the camera for a range of film speeds. The camera in which the present invention is illustrated in the accompanying drawings is of this type. In such cameras, the prior art manner of compensating for backlighting is obviously limited in utility because it produces a correct compensation for only one film speed.

It has been found that the automatic exposure control system of the present invention lends itself to a more flexible form of backlight compensation, which varies with changes in film speed setting. The novel compensating structure employs a characteristic of electric measuring instruments by virtue of which the angular deflection of the instrument coil is nonlinear with respect to scene brightness at high brightness levels, but is substantially linear at all lower brightness levels. This characteristic is illustrated in FIG. 4 by the instrument response curve 120, where the axis of abscissas is marked in an arbitrary logarithmic scale of light intensities and the axis of ordinates is marked in degrees of angular deflection of the instrument coil, starting from a rest position. It is seen that the instrument response curve 120 is substantially linear over the lower range of light intensities from 1 to 32 and that the curve has a drooping characteristic for light intensities above 32. The linear and nonlinear ranges of the instrument are, of course, merely illustrated in FIG. 4, as emphasized by the fact that the light-intensity values are in arbitrary units.

In FIG. 4, the curve labelled "ASA 40" indicates the diaphragm apertures (axis of abscissas) corresponding to various angles of rotation of the diaphragm vane when the meter body is in its angular position corresponding to a film speed of ASA 40. In the absence of any backlight compensation at ASA 40, the upper portion of this curve would have a drooping characteristic, indicated at 122 by a broken line, in order to produce the ideal aperture values in cooperation with an instrument that follows curve 120. On the other hand, if the diaphragm aperture is flared to produce some compensation starting for example at a light intensity of 32 (an aperture value of f/11 and ASA 40), then the upper part of the ASA 40 curve becomes straighter, but still droops slightly, as indicated by the solid line.

When the instrument body is rotated, for example 10 degrees, to adjust the system for a film speed of ASA 20, or more particularly when other means of changing film speed, such as masking the cell or shunting the instrument are employed, an uncompensated system should set the diaphragm aperture exactly one stop larger (more light through the lens) for each value of light intensity. However, since the curve for ASA 40 droops somewhat, event if compensated, between light-intensity values of 32 and 128, and since the curve ASA 20 is raised on the axis of ordinates to correspond to rotation of the instrument body, the latter curve is substantially straight between the light-intensity values 32 and 128. Therefore, the diaphragm aperture for ASA 20 is more than one stop larger in this region than it is for ASA 40. The additional increase in aperture size, arising from system operation on a straight part of the vane-deflection curve, automatically introduces a backlight compensation when the light-intensity value is above 32. This compensation is introduced at approximately the theoretically correct position on the light intensity scale, corresponding to the arbitrarily chosen value of 32 where it was assumed such corrections should begin.

It is understood, of course, that the curves of FIG. 4 are merely typical of a large variety of curves of instrument response and diaphragm aperture. The backlight compensation may be introduced at any point within a considerable range of light-intensity values and may be introduced to any degree, also with a considerable range.

The invention has been described in detail with particular reference to preferred embodiments thereof, but it will be understood that variations and modifications can be effected within the spirit and scope of the invention as described hereinabove and as defined in the appended claims.

I claim:

1. In a camera having a lens system for focusing an image of a viewed scene onto a photosensitive surface, and having a photoelectric-to-mechanical transducer positioned for exposure to light from said scene and energized as a function of the intensity of said light; the combination comprising: a cam coupled to said transducer and positioned thereby as a function of the energization of said transducer; a first diaphragm vane having a first elongated, tapered aperture, said first vane being mounted for pivoting movement about a first center to move said first aperture in a first path intersecting a lens axis extending through said lens system and said photosensitive surface, said first vane also having a surface adapted to contact said cam; a second diaphragm vane having a second elongated, tapered aperture, said second vane being mounted for pivoting movement about a second center, removed from said first center, to move said second aperture in a second path intersecting said first path substantially on said lens axis; a first tendency drive member adapted for cyclic movement; a second tendency drive member integral with said second vane and disposed in cooperative relation with said first tendency drive member to yieldably pivot said second vane in a first angular direction in response to each cycle of movement of said first tendency drive member; means interrelating said first and second vanes and operable, in response to pivoting said second vane in said first angular direction, for pivoting said first vane in a direction to engage said surface with said cam; and means urging said first vane in a direction to disengage said surface from said cam and urging said second vane in a second angular direction opposite to said first angular direction.

2. In a camera having a lens system for focusing an image of a viewed scene onto a photosensitive surface, and having a photoelectric-to-mechanical transducer positioned for exposure to light from said scene and energized as a function of the intensity of said light; the combination comprising: a first diaphragm vane having a first elongated, tapered aperture, said first vane being coupled to said transducer and pivotally positioned thereby about a first center to move said first aperture in a first path intersecting a lens axis extending through said lens system and said photosensitive surface; a second diaphragm vane having a second elongated, tapered aperture, said second vane being mounted for pivoting movement about a second center, removed from said first center, to move said second aperture in a second path intersecting said first path substantially on said lens axis; a first tendency drive member adapted for cyclic movement; a second tendency drive member integral with said second vane and disposed in cooperative relation with said first tendency drive member to yieldably pivot said second vane in a first angular direction in response to each cycle of movement of said first tendency drive member; means interrelating said first and second vanes for limiting the pivoting movement of said second vane in said first angular direction as a function of the angular position of said first vane; and means urging said second vane in a second angular direction opposite to said first angular direction.

3. In a camera having a lens system for focusing an image of a viewed scene onto a photosensitive surface, a member having a fixed aperture aligned with said lens system, and a photoelectric-to-mechanical transducer positioned for exposure to light from said scene and energized as a function of the brightness of said scene; the combination comprising: a cam coupled to said transducer and positioned thereby as a function of the energization of said transducer; a diaphragm vane having an elongated, tapered aperture and adapted for movement through a predetermined path to overlap various sections of said tapered aperture with said fixed aperture to form an exposure aperture; means urging said vane out of contact with said cam; and cyclically moving means cooperating with said vane for intermittently and yieldably driving said vane against said urging means and into contact with said cam.

4. The combination defined in claim 3, wherein said cam constitutes a part of a second diaphragm vane having a second elongated, tapered aperture and wherein movement of said cam by said transducer moves said second tapered aperture through a path at an angle to the path of said first tapered aperture, said tapered apertures overlapping in alignment with said lens axis.

5. The combination defined in claim 3, with: a first friction member on said cyclically moving member; and a second friction member on said vane and disposed for cyclic cooperation with said first friction member for yieldably and intermittently driving said vane in response to movement of said cyclically movable means.

6. The combination defined in claim 3, with: a first magnetic member on said cyclically moving member; and a second magnetic member on said vane and disposed for cyclic cooperation with said first magnetic member for yieldably and intermittently driving said vane in response to movement of said cyclically movable means.

7. The combination defined in claim 3, with: a second diaphragm vane having a second elongated, tapered aperture, said second vane having a first member in driving engagement with said first vane and having a second member in yieldably driven engagement with said cyclically moving means, said members and second vane constituting interponents between said cyclically movable means and said first vane, the position of said second vane being determined by the cooperation between said vanes and said cyclically moving member.

8. The combination defined in claim 7, wherein said first and second members cooperate in frictional engagement.

9. The combination defined in claim 7, wherein said first and second members are formed of magnetic material, at least one of said members comprising a permanent magnet.

10. The combination defined in claim 3, with: a fixed casing enclosing at least a part of said transducer and having a viewing locus, said part of the transducer carrying a scale of film-speed values disposed for selective alignment of any of said values with said viewing locus; and manually operable means for moving said part of the transducer relative to said fixed casing and to said vane for adjusting the operating range of said transducer to compensate for film speed in accordance with the film-speed value aligned with said viewing locus.

11. The combination defined in claim 10, wherein said transducer has a substantially linear response over a lower range of scene brightnesses and a substantially nonlinear response over a higher range of scene brightnesses.

12. The combination defined in claim 3, with: a fixed member having a pair of viewing loci, a part of said transducer carrying a pair of scales disposed in cooperative relation with respective ones of said viewing loci, each scale having respective first and second ranges, the second range of the first scale being graduated in film speed values and the first range of the second scale being graduated in diaphragm aperture values, corresponding areas of said scale ranges being simultaneously aligned with the respective viewing loci; manually operable means for moving said part of the transducer relative to said vane and to said fixed member to compensate for film speed in accordance with the film speed value aligned with the first viewing locus when any part of the second ranges of said scales are aligned with the respective viewing loci; means controlled by said manually operable means for disabling said transducer and for manually positioning said cam when said part of the transducer is moved to align the first ranges of said scales with the respective viewing loci.

13. In a camera having a lens system for focusing an image of a viewed scene onto a photosensitive surface, a photocell positioned for exposure to light from said scene and energized as a function of the brightness of said scene, an electric measuring instrument having a pivoted coil coupled to said photocell for angularly deflecting said coil relative to said instrument as a function of the energization of said photocell, and an exposure diaphragm with an aperture of variable size aligned with said lens system and said photosensitive surface, said diaphragm being disposed in cooperative relation with said coil to determine the size of said aperture as a function of the position of said coil, the combination comprising: an inner cylindrical shell enclosing at least a part of said instrument and integral therewith and having a scale of film-speed values extending through a circumferential arc on the outer surface of said inner shell; an outer cylindrical shell enclosing at least part of said inner shell and fixed to said camera, said outer shell having a window aligned axially with said scale; and manually operable means for moving said inner shell and instrument angularly within said outer shell; and wherein the angular deflection of said coil with respect to scene brightness is substantially linear over a lower range of scene brightnesses and is substantially nonlinear over a higher range of scene brightnesses.

14. The combination defined in claim 13, wherein said scale has two ranges, the second of said ranges being graduated in said film-speed values, said inner shell having a second scale disposed in substantially parallel relation to said first scale, said second scale having two ranges, the first range of said second scale being graduated in diaphragm aperture values, and said outer shell having a second window axially aligned with said second scale and circumferentially positioned such that the corresponding ranges of said scales are simultaneously aligned with respective ones of said windows; with means operable, only in response to alignment of said first ranges with said windows, for disabling the coupling between said instrument and said photocell.

References Cited in the file of this patent

UNITED STATES PATENTS

| | | |
|---|---|---|
| 2,250,898 | Tonnies | July 29, 1941 |
| 2,421,499 | Guedon | June 3, 1947 |
| 2,838,985 | Burger et al. | June 17, 1958 |
| 2,841,064 | Bagby et al. | July 1, 1958 |

FOREIGN PATENTS

| | | |
|---|---|---|
| 698,573 | Great Britain | Oct. 21, 1953 |